Oct. 13, 1931.     I. DAVIS     1,826,706

METHOD OF MAKING SHEET ROOFING

Filed July 12, 1929

Inventor

~ Isadore ~ Davis ~

By M. Talbert Dick
Attorney

Patented Oct. 13, 1931

1,826,706

UNITED STATES PATENT OFFICE

ISADORE DAVIS, OF MARSHALLTOWN, IOWA

METHOD OF MAKING SHEET ROOFING

Application filed July 12, 1929. Serial No. 377,769.

The principal object of this invention is to provide a roofing that is economical in manufacture, exceptionally durable in use and refined in appearance.

A further object of my invention is to provide a roofing that may easily be caused to conform to the outline of the surface upon which it rests and one that when once installed retains its form indefinitely.

A still further object is to provide a roofing that is uniform in thickness and maintains such uniformity throughout its useful life.

A still further object of my invention is to provide a roofing that is water proof, of great tensile strength, but light in weight.

These and other objects will be apparent to those skilled in the art.

My invention consists in the method hereinafter set forth, pointed out in my claims and illustrated in the accompanying drawings in which:

Figure 1:
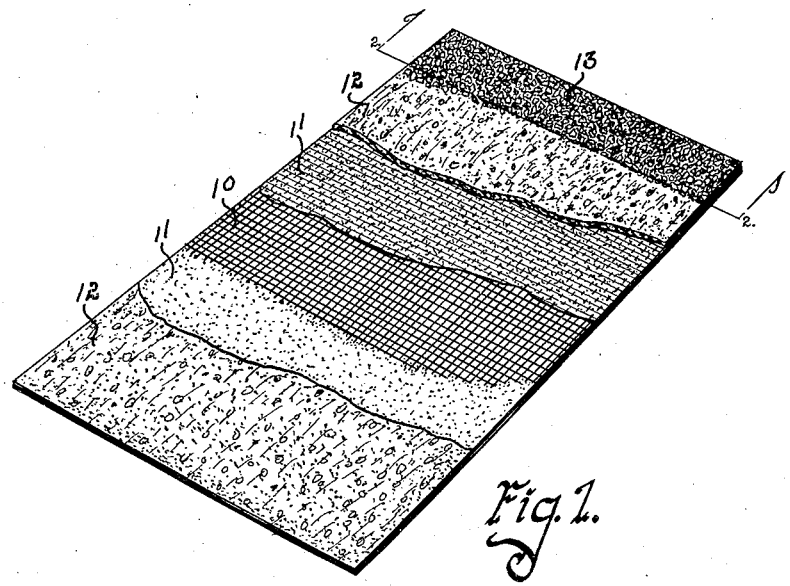
Fig. 1 is a perspective view of a strip of my roofing with sections cut away to more fully illustrate its construction.
Figure 2:
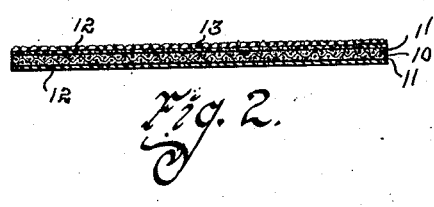
Fig. 2 is a cross sectional view of the roofing taken on line 2—2 of Fig. 1.

One of the chief objections to sheet roofing now on the market is its inability to withstand hard usage from weather and sun, but this has been overcome as will be appreciated by those familiar with the art.

I have used the numeral 10 to designate a metal fabric such as screen wire and which acts as a base in the making of my roofing. This metallic screen is first immersed in raw rubber which has been reduced to a liquid state by suitable heat. The temperature at which the liquid rubber is maintained during this immersing process should not be very high, i. e. not over one hundred and seventy-five degrees Fahrenheit and this is made possible by the raw rubber being reduced to a semi-liquid state by suitable chemicals and which is well known in the art and often goes by the name of rubber cement as used in the tire industry. In fact this raw rubber may be so reduced to a liquid form by these chemicals well known in the art that the same may be applied to the metal fabric in a comparatively cold state. If desired, a small amount of asphalt may be added to the liquid rubber to prevent it from rotting when in use. Upon withdrawing this screen it will be noted that it will possess a rubber coating 11, completely embedding all the strands and filling the mesh of the screen. However the strands of the screen will, although covered with rubber, show in outline thereby providing a very rough surface on each side of the sheet. The metal fabric should not be of galvanized material as such material does not successfully stick to the rubber. After withdrawing the screen from the liquid rubber it should be hung up and allowed to dry for approximately one-half hour after which time it should be dipped in hot liquid asphalt which has been reduced to a liquid state by subjecting the same to temperatures from one hundred and ninety to two hundred degrees Fahrenheit. This last mentioned immersion provides a layer of asphalt 12 on each side of the sheet and by the strands of the wire forming a rough surface the asphalt will be prevented from running by force of gravity and causing a sheet of varying thicknesses.

My method of forming a roofing assures a sheet of uniform thickness and because of the same reason as above described the thickness will remain uniform in use when on hot days as the sun has a tendency to melt the asphalt and cause it to run.

After withdrawing the sheet from the asphalt, and before the asphalt has completely dried, ground slate, sand, asbestos, gravel, or the like 13 should be spread over the upper surface of the sheet as shown in the drawings. This crushed or granular material will readily adhere to the asphalt and form a storm and weather resisting surface which is very refined in appearance.

From the foregoing it will be noted that I have provided a roofing of great tensile strength, light in weight and one that is absolutely water proof. Besides providing a very suitable base, and giving strength, the wire fabric 10 allows the sheet to be bent to conform to the outline of the supporting surface 14 and to maintain that shape. It also holds the sheet flat on the supporting surface and prevents "curling" of the roofing in use and provides a durable base through which nails may be driven to hold it onto the supporting surface.

Figure 3:
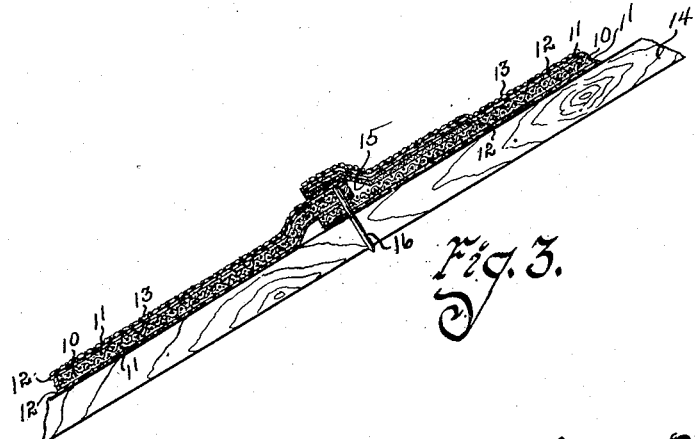
Fig. 3 is a cross sectional view of my invention illustrating the manner in which two strips or sheets of my roofing are held together when resting on a supporting surface.

In Fig. 3, I show a novel method of securing the various sheets of roofing together and onto the supporting surface. A strip of cloth fabric 15 is secured at one marginal edge of each base 10 before the dipping processes by being cemented by suitable glue or rubber cement at its inner marginal edge. This provides a flap portion which, when the sheets are laid on the supporting surface extends over the sheet of roofing adjacent to it as shown in the drawings. The sheets are secured to the supporting surface by nails 16 driven through the sheets into the supporting surface 14 and having their heads protected from rust and weather by being under the flaps of the cloth strips 15. After the roofing is laid, asphalt, tar, cement, or the like may be placed over and around the cloth strips, thereby securely holding them down over the joints of the sheets of roofing and making the complete roofing storm and rain proof.

Although I have designated the applying of the rubber and asphalt coatings by dipping, the same may be applied by other means, such as by brush.

Once the roofing is installed on a supporting surface, it is of long life and is not subject to damage by hail or the like.

I claim:

1. The method of making sheet roofing consisting of taking a base, dipping said base in liquid rubber to such an extent as to cover the said base, dipping said rubber covered base in asphalt, and applying granular material to said asphalt.

2. The method of making sheet roofing consisting of taking a porous base, dipping said base in liquid rubber to completely coat said base with the material in which it is dipped, dipping said rubber covered porous base in asphalt, and coating one side of said asphalt with hard granular material.

3. The method of making sheet roofing consisting of taking a coarse metallic fabric, subjecting said fabric to liquid rubber to such an extent that the same is completely covered and the meshes filled, allowing the rubber coating to dry, and then subjecting the rubber coated metallic fabric to liquid asphalt.

4. The method of making sheet roofing consisting of taking screen wire, dipping the same in melted rubber, allowing the rubber to cool and dry, dipping the rubber covered screen in melted asphalt, and applying granular rock to one side of the sheet before the asphalt is dry.

ISADORE DAVIS.